(12) United States Patent
Demonfort

(10) Patent No.: US 10,793,271 B2
(45) Date of Patent: Oct. 6, 2020

(54) DRONE AND ASSOCIATED AIRBORNE INTERVENTION EQUIPMENT

(71) Applicant: DAE, Ciboure (FR)

(72) Inventor: Thierry Demonfort, Ciboure (FR)

(73) Assignee: DAE, Ciboure (FR)

( * ) Notice: Subject to any disclaimer, the term of this patent is extended or adjusted under 35 U.S.C. 154(b) by 285 days.

(21) Appl. No.: 15/537,639

(22) PCT Filed: Dec. 18, 2015

(86) PCT No.: PCT/EP2015/080667
§ 371 (c)(1),
(2) Date: Jun. 19, 2017

(87) PCT Pub. No.: WO2016/097375
PCT Pub. Date: Jun. 23, 2016

(65) Prior Publication Data
US 2017/0361929 A1    Dec. 21, 2017

(30) Foreign Application Priority Data
Dec. 19, 2014    (FR) .................................. 14 62921

(51) Int. Cl.
*B64C 39/02*    (2006.01)
*B64D 5/00*    (2006.01)

(52) U.S. Cl.
CPC .............. *B64C 39/026* (2013.01); *B64D 5/00* (2013.01); *B64C 2201/048* (2013.01);
(Continued)

(58) Field of Classification Search
CPC ........ B64C 2201/048; B64C 2201/082; B64C 2201/128; B64C 2201/141;
(Continued)

(56) References Cited

U.S. PATENT DOCUMENTS 2,797,881 A * 7/1957 Andrews .................. B64D 5/00
244/2
3,003,717 A * 10/1961 Booker .................... B64D 5/00
244/114 R
(Continued)

FOREIGN PATENT DOCUMENTS

EP    0 786 403 A1    7/1997
WO    WO 2011/002309 A1    1/2011

OTHER PUBLICATIONS

International Search Reportand Written Opinion issued by the European Patent Office, acting as the ISA, for International Application PCT/EP2015/080667 dated Mar. 11, 2016.

*Primary Examiner* — Medhat Badawi
(74) *Attorney, Agent, or Firm* — McCarter & English, LLP

(57) ABSTRACT

The present invention relates;—to a drone comprising a fuselage (1) provided with a carrying means (11, 12) capable of allowing a belly-to-ground flight position and an inverted flight position, at least one propulsion means (2), autonomous navigation instruments and an axial compartment (10) forming a recess incorporated into an upper part of the fuselage in order to receive a parachutist (h) in the lying position, avionics provided with programmable control means coupled to the autonomous navigation instruments and means for releasing said parachutist controlled by said avionics, characterised in that said release means are designed and intended to ensure the release of said parachutist in the inverted flight position, and,—to a piece of airborne intervention equipment.

18 Claims, 3 Drawing Sheets

(52) U.S. Cl.
CPC .. *B64C 2201/082* (2013.01); *B64C 2201/128* (2013.01); *B64C 2201/141* (2013.01); *B64C 2201/145* (2013.01); *B64C 2201/185* (2013.01)

(58) Field of Classification Search
CPC ........ B64C 2201/145; B64C 2201/185; B64C 39/026; B64D 5/00
See application file for complete search history.

(56) References Cited

U.S. PATENT DOCUMENTS

| | | | | |
|---|---|---|---|---|
| 3,088,693 | A * | 5/1963 | Brown | B64D 5/00 244/3 |
| 3,138,350 | A * | 6/1964 | Lovett, Jr. | B64C 39/026 244/23 C |
| 3,273,824 | A * | 9/1966 | Owens | B64C 39/026 244/17.11 |
| 3,443,775 | A * | 5/1969 | Williams | B64C 39/026 244/4 A |
| 3,520,502 | A * | 7/1970 | Smethers, Jr. | B64D 5/00 104/103 |
| 3,568,953 | A * | 3/1971 | Beezley | B64C 29/00 244/2 |
| 3,823,901 | A * | 7/1974 | Holmes | B64D 1/02 244/118.1 |
| 4,253,625 | A * | 3/1981 | Dmitrowsky | B64C 39/026 244/4 A |
| 4,379,532 | A * | 4/1983 | Dmitrowsky | B64C 39/026 244/4 A |
| 4,462,560 | A * | 7/1984 | Earl | B64F 1/10 180/116 |
| 5,000,398 | A * | 3/1991 | Rashev | B64C 27/08 244/110 E |
| 5,372,332 | A * | 12/1994 | Spacht | B64D 5/00 244/118.2 |
| 6,082,675 | A * | 7/2000 | Woodall, Jr. | B64D 1/02 244/137.4 |
| 6,293,487 | B1 * | 9/2001 | Gaite | B64D 5/00 244/3 |
| 6,315,244 | B1 * | 11/2001 | Cage, III | B64C 31/00 244/118.5 |
| 6,392,213 | B1 * | 5/2002 | Martorana | B64C 39/024 244/13 |
| 6,951,322 | B2 * | 10/2005 | Klima | B64C 1/00 244/138 R |
| 7,793,888 | B2 * | 9/2010 | Padan | B64D 1/00 244/118.1 |
| 8,608,104 | B2 * | 12/2013 | Zapata | B64C 39/026 244/12.5 |
| 8,740,134 | B2 * | 6/2014 | Suzuki | B64C 37/02 244/110 F |
| 8,950,698 | B1 * | 2/2015 | Rossi | B64C 37/02 244/2 |
| 9,010,690 | B1 * | 4/2015 | Al-Heraibi | B64D 17/00 244/100 R |
| 9,139,309 | B1 * | 9/2015 | Al-Heraibi | B64F 1/10 |
| 9,580,173 | B1 * | 2/2017 | Burgess | B64C 39/024 |
| 9,637,238 | B2 * | 5/2017 | Wypyszynski | B64D 3/00 |
| 9,849,983 | B2 * | 12/2017 | Herber | B64C 3/16 |
| 9,896,208 | B2 * | 2/2018 | Retig | B64D 5/00 |
| 9,932,110 | B2 * | 4/2018 | McNally | B64C 39/024 |
| 10,000,284 | B1 * | 6/2018 | Purwin | B64B 1/26 |
| 2002/0074454 | A1 * | 6/2002 | Henderson | B64C 39/024 244/135 A |
| 2004/0232282 | A1 * | 11/2004 | Dennis | B63B 27/26 244/110 E |
| 2005/0151009 | A1 * | 7/2005 | Roeseler | B64C 39/024 244/63 |
| 2006/0102783 | A1 * | 5/2006 | Dennis | B64C 39/024 244/110 F |
| 2006/0108477 | A1 * | 5/2006 | Helou, Jr. | B64C 1/00 244/137.1 |
| 2009/0224094 | A1 * | 9/2009 | Lachenmeier | B64C 39/024 244/13 |
| 2009/0294573 | A1 * | 12/2009 | Wilson | B64C 39/024 244/2 |
| 2009/0314883 | A1 * | 12/2009 | Arlton | B64C 39/024 244/63 |
| 2010/0025523 | A1 * | 2/2010 | Kutzmann | B64C 39/024 244/2 |
| 2011/0049288 | A1 * | 3/2011 | Suzuki | B64C 37/02 244/2 |
| 2013/0062457 | A1 * | 3/2013 | Deakin | B64B 1/08 244/25 |
| 2013/0179035 | A1 * | 7/2013 | Adachi | B60Q 1/26 701/36 |
| 2014/0158812 | A1 * | 6/2014 | Luther | B64C 39/10 244/2 |
| 2014/0350748 | A1 * | 11/2014 | Fisher | B64C 39/024 701/2 |
| 2015/0336685 | A1 * | 11/2015 | Wan | B64G 1/005 244/2 |
| 2016/0214717 | A1 * | 7/2016 | De Silva | B64D 5/00 |
| 2017/0072755 | A1 * | 3/2017 | Zhou | B64C 29/0075 |
| 2017/0073070 | A1 * | 3/2017 | Xing | B64C 39/024 |
| 2017/0361929 | A1 * | 12/2017 | Demonfort | B64C 39/026 |

* cited by examiner

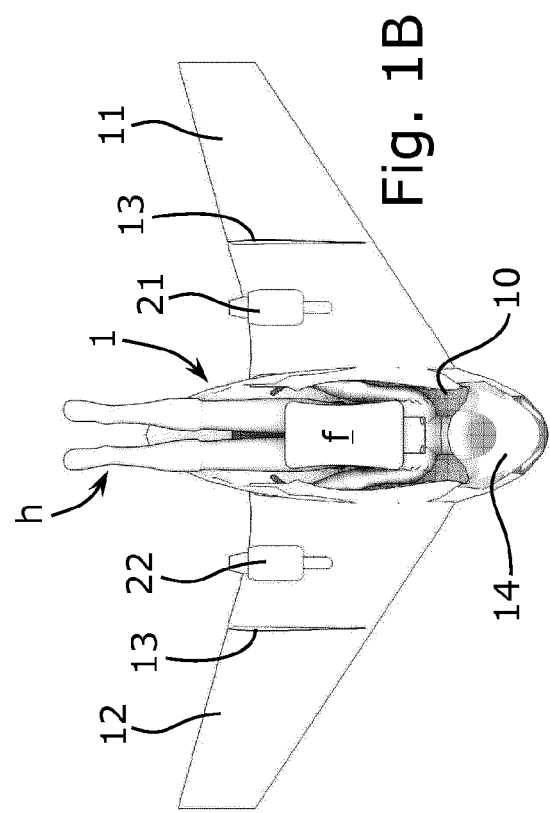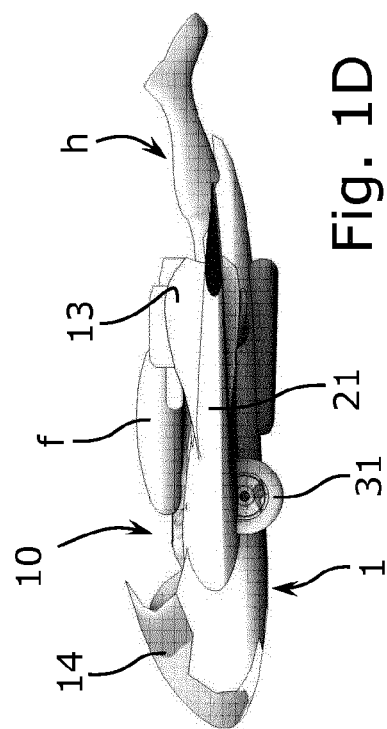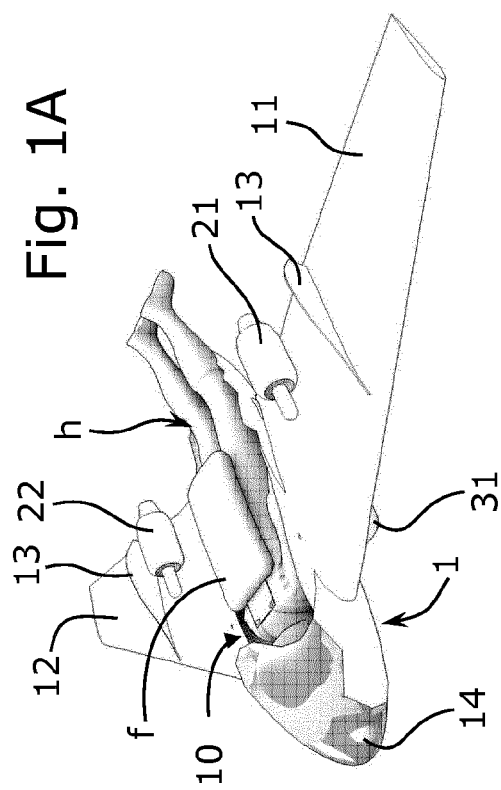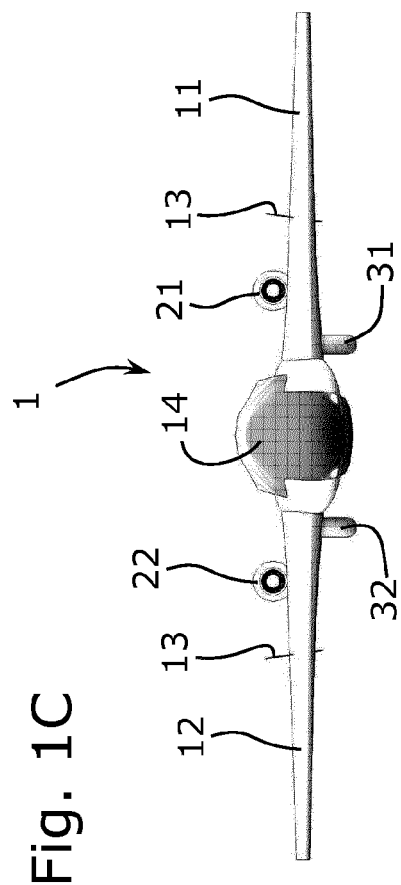

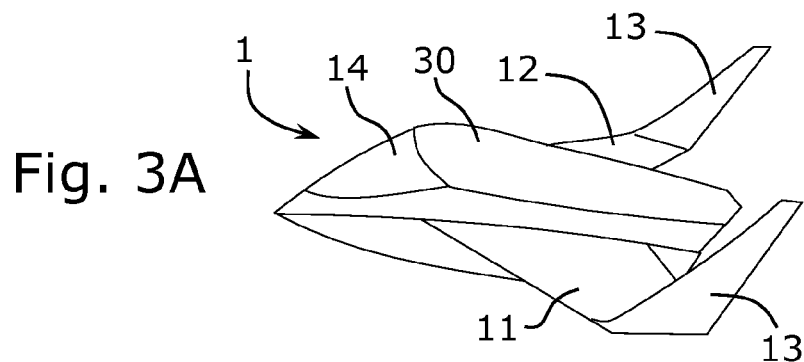
Fig. 3A
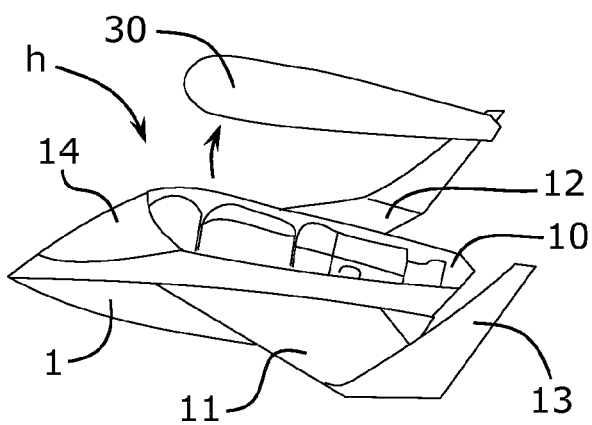
Fig. 3B
Fig. 3C
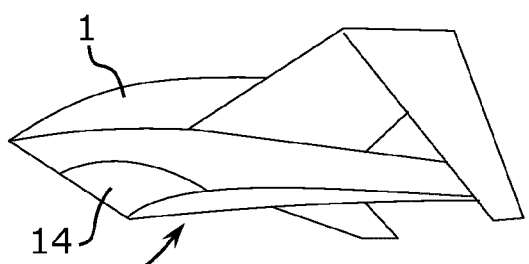
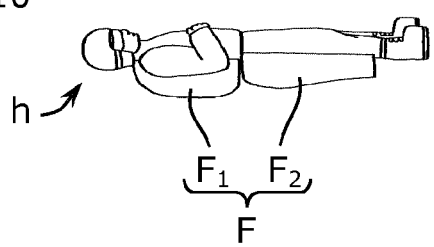
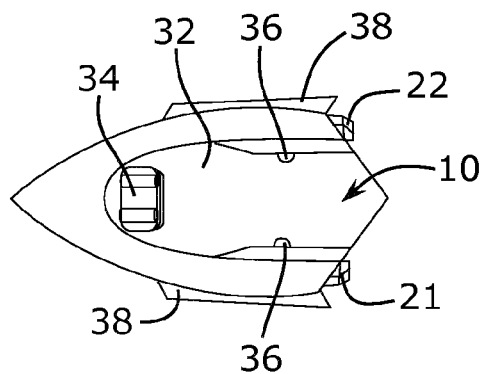
Fig. 4

DRONE AND ASSOCIATED AIRBORNE INTERVENTION EQUIPMENT

CROSS-REFERENCE TO RELATED APPLICATIONS

This application is the National Stage entry under 35 U.S.C. § 371 of International Application Number PCT/EP2015/080667 filed on Dec. 18, 2015, published on Jun. 23, 2016 under publication number WO 2016/097375 A1, which claims the benefit of priority under 35 U.S.C. § 119 of French patent application number 1462921 filed Dec. 19, 2014.

TECHNICAL FIELD OF THE INVENTION

The present invention relates to a drone, particularly an air-droppable drone and an airborne intervention equipment including such a drone, in addition to a method for air-dropping. More specifically, the invention relates to a drone droppable from an aircraft and capable of heading towards a target before dropping, in turn, a material load and/or a parachutist,

PRIOR ART

Drones are motorised aircraft, with neither a human operator nor an onboard pilot, which generally take off from a prepared runway located at a distance from an area which is not readily accessible.

They comprise in particular a fuselage equipped with means of lift (wings, . . . ), at least one propulsion unit, navigation instruments, onboard electronics and if appropriate, means of carrying a payload.

These drones are remote-controlled from the ground, controlled from aircraft flying at high altitude or pre-programmed.

Owing to their good manoeuvrability, their long endurance and their stealth, these vectors are in widespread use by the armed forces or security forces in surveillance, peacekeeping, intelligence or targeted strike missions, thereby eliminating risks of loss of life.

Furthermore, when these drones axe radio-controlled from a control centre situated on the ground or aboard an aircraft, they are readily detectable and carry high risks of neutralisation by the enemy.

Moreover, implementation of these drones requires ground-based infrastructures (take-off runway or launching ramp) or seaborne infrastructures, which restricts their operational abilities and particularly their reactivity and increases their vulnerability.

Tactical transport aircrafts make it possible to perform air-dropping activities, meeting discretion and protection requirements that do not allow infiltration of airborne systems over a long distance and particularly penetration of airspace controlled by a hostile area.

Document U.S. Pat. No. 6,082,675 describes an air-droppable drone releasable from an aircraft, said drone carrying a load, namely an acoustic buoy. The drone is fixed under the fuselage of the parent aircraft and the acoustic buoy is itself fixed under the fuselage of the drone. After dropping, the drone is unobtrusively remotely guided by satellite into a possibly hostile environment until it reaches a target area where it parachutes the acoustic buoy, which alights in the conventional manner. This drone is not, however, suitable for transporting a person.

Document WO 2011/002309 describes an aircraft air-droppable from another transport aircraft and designed to receive a single occupant lying in the prone position. This document also mentions the parachutist's possibility of abandoning the aircraft in flight. The conditions for this abandonment are not specified, however, and appear particularly dangerous, particularly as the parachutist, on leaving the aircraft, is exposed to a major risk of interference with the aircraft tail or engines.

Consequently, no device currently allows performance of air-dropping activities resulting in stealthy infiltration into hostile airspace over long distances and controlled with a view to targeted, discreet dropping of personnel.

SUMMARY OF THE INVENTION

The aim of the present invention is to solve these technical problems reliably and efficiently by providing a drone capable of conveying a parachutist to the immediate vicinity of an external theatre of operation and allowing his/her release under secure conditions.

This aim is achieved, according to a first aspect of the invention, by means of a drone comprising a fuselage equipped with means of lift capable of allowing a belly-to-ground flight position and an inverted flight position, at least one propulsion unit, autonomous navigation instruments and an axial compartment forming a recess incorporated in an upper part of the fuselage in order to receive a parachutist lying in the prone position, avionics provided with programmable control means coupled to the autonomous navigation instruments and means of dropping said parachutist controlled by said avionics, wherein said drone is designed and intended to ensure release of said parachutist in the inverted flight position. By allowing for the drone's ability to roll on to its back and its capability to release the parachutist in the inverted flight position, a highly simple fuselage structure can be maintained, without a parachutist release flap and without sophisticated ejection means, wherein release can be performed by free fail.

The avionics preferably comprise means of controlling a procedure for rolling the drone over into inverted flight position and for maintaining the inverted. flight position until release of the parachutist has been completed. Initiation of this procedure may be automatic, or may be performed remotely. However, and preferentially, the avionics comprise a human-machine triggering interface allowing the parachutist to initiate the inversion procedure. In practice, the avionics inform the parachutist when the conditions for triggering release are fulfilled and the parachutist validates triggering. Specifically, these conditions may for example include one or several of the following cumulative conditions: arrival in the release area, at an altitude compatible with release, absence of turbulence and prior undocking of the parachutist. If necessary, the drone comprises specific sensors for checking that these conditions are fulfilled, particularly means of detecting undocking of the parachutist. The drone may also comprise means of detecting release of the parachutist or of the parachutist's leaving the axial compartment. Inverted flight can be maintained until confirmation of actual release of the parachutist by these means of detection. Alternatively, inverted flight can be maintained for a predetermined period, 30 seconds for example, which is sufficient to ensure actual release. Preferably, the drone subsequently turns over on its belly to perform a return journey to its base or to the dropping, landing or splashdown point scheduled for the end of its mission.

Preferably, the axial compartment comprises a bottom to accommodate the parachutist in the prone position and a booster support protruding in relation to the bottom to support the parachutist's head and/or upper part of the torso of the parachutist lying in the prone position. The parachutist can thus comfortably adopt a position in which his/her forearms are stretched forward and the top of his/her torso is slightly raised, which allows him/her to access a human-machine control interface, in practice a control panel and/or joystick, for example in order to validate specific operations controlled by the control means or resume control, particularly in order to prepare or initiate release operations or for evasive manoeuvres.

According to one embodiment, the drone comprises straps or rods for maintaining the parachutist lying in the prone position in the compartment and means of automatically undocking the straps or rods, preferably when the drone is in belly-to-ground flight position. These means of automatic undocking may in particular comprise one or several pyrotechnically driven blades. These means of undocking may in particular be controlled by a chronobarometric or purely barometric system. It is also foreseeable to provide means of rapid manual undocking, either instead of the means of automatic undocking or as an additional backup solution.

According to one embodiment, the propulsion unit comprises two turbojets positioned laterally on the outside and on either side of a median portion of the fuselage in which the axial compartment is located, in order to avoid any inference between the turbojets and the parachutist when the latter leaves the compartment in free fall during release in inverted position. The two turbojets can be arranged in particular on or preferably under lateral wings of the drone.

For the same reasons, the fuselage is preferably devoid of a tail fin projecting upwards from the upper part of the fuselage in relation to the belly-to-ground flight position. Alternatively, provision can be made for two lateral tail fins, which in this case must however be mandatorily positioned on either side of a median portion of the fuselage in which the axial compartment is located, in order to avoid any inference between the turbojets and the parachutist when the latter leaves the compartment in free fall during release in inverted position.

According to one embodiment, the axial compartment is open. According to an alternative embodiment, the axial compartment is closed by a cover releasable in belly-to-ground flight position. The fuselage, may comprise a front windshield. It may also be provided with a lower porthole to allow the parachutist, lying in the compartment in the prone position to observe the terrain below him/her when the aircraft is in belly-to-ground flight position.

According to one embodiment, the drone furthermore comprises means for carrying an onboard payload and means of releasing said onboard payload controlled by said avionics. These means for carrying the onboard payload may in particular comprise a hold closed off at the bottom by at least one movable flap allowing release of the onboard payload in belly-to-ground flight position, wherein said compartment is situated above said hold. The means of carrying the onboard payload may also be situated, when the drone is in belly-to-ground flight position, in a top part of the cavity integrated in an upper part of the fuselage in order to carry on board the parachutist in the prone position, wherein a volume is retained in the cavity to accommodate at least a portion of the parachutist's body under these means of carrying. Under these circumstances, a payload to be released simultaneously with the parachutist is involved and is preferably secured to the parachutist. The means of carrying release the parachutist in this case of all or part of the weight of the onboard payload during the flight.

According to other characteristics, the programmable control means consist of avionics comprising an onboard computer associated with software and interacting with the autonomous navigation instruments.

Preferably, the autonomous navigation instruments comprise GPS-type satellite positioning means.

In yet another alternative solution, the fuselage is equipped with a recovery parachute to execute the final phase of return to base and if appropriate, inflatable sponsons to ensure buoyancy in case of splashdown.

According to another aspect of the invention, the latter relates to a drone, particularly a drone as described above, air-droppable from a transport aircraft and comprising fuselage support means allowing its controlled separation from the aircraft in the airspace and means of automatic ignition of the propulsion unit during gravitational fail of the fuselage.

According to a specific variant, the support means are designed to cooperate with a travel and guidance ramp created on the floor of the transport aircraft and emerging in the airspace via its rear exit.

Preferably, the support means comprise an undercarriage equipped with wheels.

Another object of the invention concerns airborne intervention equipment comprising a transport aircraft provided with a rear exit emerging in the airspace and a drone as defined above, equipped in particular with support means and means of carrying a parachutist as well as a load if necessary and capable of being loaded into the cabin of the transport aircraft, characterised in that the rear exit is equipped with a guidance ramp interacting with the support means of the drone, allowing its controlled separation from the aircraft in the airspace and in that the drone is provided with means of releasing said parachutist and if appropriate, said load. Air-dropping of the drone can be performed by gravity or assisted by ejection means, particularly by an ejector parachute.

By being dropped from a tactical transport aircraft, the drone according to the invention acquires extensive deployability.

Furthermore, owing to its flight autonomy and its launching by air-dropping at a high altitude, the drone according to the invention can rapidly, precisely and discreetly reach hostile areas and thus parachute an operator and/or equipment very close to the target.

In this manner, the tactical transport aircraft remains away from the hostile area in order to reduce its vulnerability and make final release as discreet as possible.

By means of an interface between the fuselage and the floor of the transport aircraft, the invention makes it possible to execute the phase of travel and guidance of the drone to exit from the aircraft without any risk of interference.

Automatic ignition of the propulsion unit is performed following the glide phase of the drone at a precise altitude by means of the onboard avionics which also automatically control the sequence of releasing the parachutist and/or the onboard payload.

Consequently, the drone according to the invention is thus well suited to conducting special or intelligence operations.

BRIEF DESCRIPTION OF THE FIGURES

The invention will be understood better from reading the following description, accompanied by the drawings explained hereafter.

FIGS. 1A to 1D illustrate overall views of an embodiment of the drone according to the invention in a top, front, and side perspective view respectively.

FIGS. 3A to 3C illustrate different flight phases of a drone according to a second embodiment of the invention.

FIG. 4 illustrates the inside of a compartment for accommodating an occupant of the drone according to the second embodiment of the invention.

Figure 2:
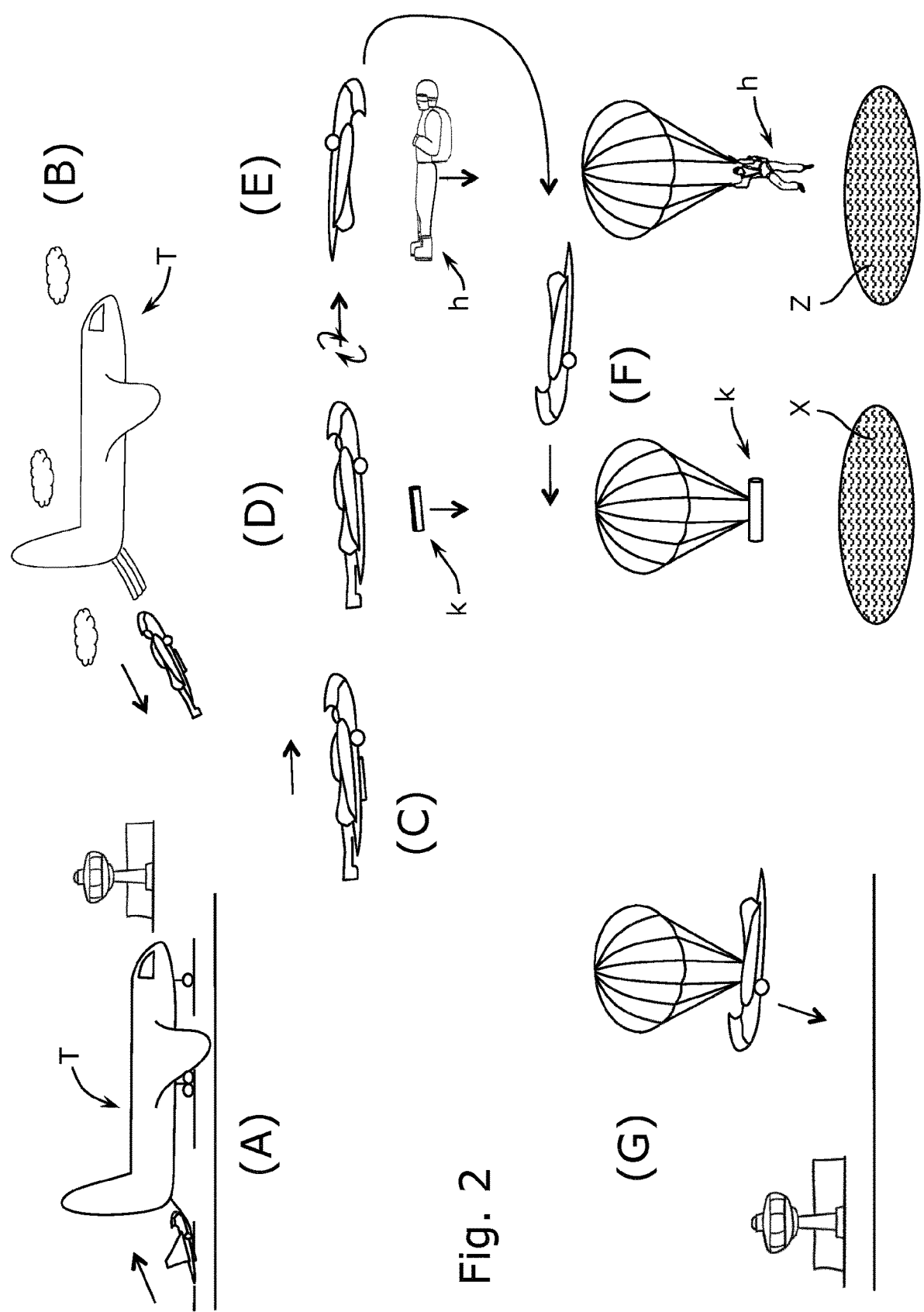
FIG. 2 shows a diagrammatic view of the different phases of an example of method of use of the drone according to the invention.

For greater clarity, identical features will be identified by identical reference signs in all the figures.

DETAILED DESCRIPTION OF THE EMBODIMENTS

The drone according to a first embodiment of the invention is designed and intended for air-dropping from a logistic or tactical transport aircraft T illustrated diagrammatically in FIG. 2.

As illustrated in FIGS. 1A to 1D, this drone is itself formed or a smaller aircraft comprising, in particular, a fuselage 1 equipped with means of lift such as possibly foldable lateral wings 11, 12 and one or several tailplanes 13, an engine preferably consisting of at least one propulsion unit 2, autonomous navigation instruments (no illustrated) and means of carrying a cargo and/or a parachutist (paratrooper or simple parachutist).

In the embodiment in FIGS. 1A-1D, the propulsion unit 2 consists of two turbojets 21, 22, providing a thrust on the order of 40 to 160 kg for a drone, the total deployed mass of which is less than 500 kg with a payload airlift capability of between 100 and 250 kg.

A compartment 10 is arranged in the form of a cavity integrated in the upper part of the fuselage 1 of the drone to accommodate an occupant h in the ventral prone position, with the head facing towards the front of the fuselage 1. The compartment 10 is equipped, at the front, with a windshield 14 creating a protection bubble via the aerodynamic effect. The compartment is open on the top and preferably towards the rear. According to the dimensions of the compartment and size of the parachutist, it may be foreseen that the latter's legs protrude at the rear of the fuselage, as illustrated in FIGS. 1A-1D.

Notably, the fuselage 1 does not have a tail. The turbojets 21, 22 are arranged laterally on the outside and on either side of a median portion of the fuselage 1 in which the compartment 10 is located.

If necessary, depending on the contemplated use of the drone and the radius of action required for its mission, the method of propulsion could be modified and adapted specifically to this mission.

The fuselage 1 can be provided, as illustrated in FIGS. 1C and 1D, with support means such as a set of wheels 31, 32, either fixed or retractable, to allow landing if necessary.

According to a characteristic not illustrated, the fuselage is equipped with a mechanical guidance and travel interface capable of interacting, for example, with a ramp (or rails) fixed to the floor of the hold of the transport aircraft T and extending to its axial exit, which in the horizontal position (following controlled opening) emerges in the open air in the airspace.

As illustrated in FIG. 2 (stage A), the drone is initially loaded, at the departure base, into the cabin of the civil cargo aircraft or logistic or tactical military transport aircraft T.

For regulatory safety reasons, refuelling of the drone is performed before its loading into the transport aircraft. The capacity of its tank guarantees the drone a radius of action of approximately 200 km.

The tactical transport aircraft T (of the C130 Hercules, Antonov or A400M type for example) which generally possesses a wide radius of action (of at least 5000 k) subsequently has the mission of approaching the drone to the theatre of operations by preferably flying at high altitude (between 4000 and 11,000 m).

If the capacity of the transport aircraft allows, several drones may be loaded through the axial exit and secured in position in a row in the hold of the aircraft T.

During conveyance, the drone is subsequently prepared for its intervention.

To this end and if this has not already been performed on the ground, the parachutist h (operator, paratrooper, . . . ) with his/her possible burden f and/or the payload (equipment, or material) intended to be parachuted over the area of operations X (FIG. 2) boards, with his/her equipment (helmet, suit, parachute, weapons if appropriate, . . . ), in the ventral prone position the compartment 10 arranged in the form of a cavity integrated in the upper part of the fuselage 1 of the drone (FIGS. 1A and 1B).

The drone is equipped if necessary with an oxygenation system (not illustrated) allowing performance of human missions at high altitude.

According to an alternative solution, not illustrated, the drone may be furthermore equipped with a hold integrated in the lower part of the fuselage and closed off at the bottom by a set of movable flaps (swinging or sliding). Loading is performed in this case before the drone is placed on board the transport aircraft.

According to another alternative solution, not illustrated, the compartment 10 will advantageously be equipped with appropriate means to ensure protection of the parachutist against impacts and his/her oxygen supply, allowing a human being to travel at high altitude, under optimum conditions of temperature and comfort, being equipped with a suit or protective clothing, in order to optimise his/her physiological integrity.

The parachutist h equipped with all his/her items of equipment boards the drone during the phase preceding release and preferably, according to a chronological sequence of procedures inherent to the aircraft and the release altitude.

Once the drone is prepared for its mission, the transport aircraft is positioned in release configuration (stabilisation of its path, altitude and speed of flight with a positive attitude).

The axial exit of the aircraft T is subsequently opened at the predetermined release altitude (4000 m-11,000 m).

The means of securing (straps, . . . , not illustrated) which immobilised the drone on board the transport aircraft in accordance with the currently applicable standards are then released, allowing optimum initiation of the phase of travel, guidance and orientation of the drone (nose of the drone pointing towards the front of the aircraft) before it leaves the transport aircraft, thereby guaranteeing a release phase without any interference with the aircraft consistent with the intended axis of release.

Guidance and exit of the drone from the hold of the transport aircraft are performed while being assisted by means of thrust or ejection compatible with the procedures, equipment and use of the aircraft.

The air-dropping method contemplated allows sequential release of several drones according to the invention preconditioned and secured inside the transport aircraft.

As soon as the drone exits the aircraft, after passing through the axial exit, it begins a phase of gravitational fall (FIG. 2 stage B) which is critical, since it moves in this case within the area of turbulence generated by the transport aircraft.

Following this phase, the drone stabilises and automatically adopts a flight path known as "gliding", based on the quality of slimness of the aircraft without activation of engine power. The gliding phase will be optimised to achieve a maximum radius of action without propulsion. Its duration will depend on the conditions of the aeronautical environment (essentially altitude and speed in the air mass).

Automatic activation of the means of ignition of the propulsion unit 2 is performed at a predetermined altitude and speed consistent with proper functioning of the engines (FIG. 2 stage C).

The cruising altitude of the drone will be selected so as to ensure its acoustic discretion and its protection against any interception by automatic weapons fired from the ground.

The drone according to the invention is thus fully autonomous and capable of ensuring automatic piloting of its own flight towards the target with a radius of action of approximately 200 km depending on the flight profile and onboard payload.

To this end, the drone features programmable avionics required for its automatic piloting, its localisation and its stabilisation. These avionics comprise in particular an onboard computer and conventional probes and sensors, in addition to positioning means, for example satellite (GPS) or gyroscopic means.

The flight parameters and position of the target are programmed and recorded in the avionics before loading on board the transport aircraft and in case of operational necessities, may be modified during the approach flight phase preceding release of the drone.

If necessary, for safety measures, it is possible to contemplate that the parachutist (paratrooper, . . . ) on board the drone can take over control during an evasion phase (authority based on a control stick) or modify the parameters of the initial mission by activating pre-programmed backup parameters (change of target, early return of the drone, . . . ).

When the drone reaches the position and altitude initially intended and recorded in order to perform release of the cargo k and/or the parachutist h, the avionics order a significant reduction in the speed and rotation of the drone in order to transfer to an "inverted" flying position (half-roll manoeuvre or "Immelmann"). Jointly with this operation, the avionics trigger automatic undocking of the attachment points of the payload positioned within the drone and in the absence of a parachutist, in the compartment 10.

With the alternative solution in which the drone is provided with a lower hold, when the drone reaches the position initially scheduled in order to perform release of the cargo k (payload, . . . ), the avionics of the drone order opening of the flaps of the hold (FIG. 2 stage D).

The consignment k can thus be released itself over the area X on the ground with or without a parachute.

The parachutist h is preferably held during flight in the prone position by securing straps. Means of undocking are activated automatically in order to release the securing straps, preferably before the drone rolls over to transfer to an inverted flight position as illustrated in FIG. 2, which allows release in free fall of the parachutist under the fuselage at the scheduled release point (FIG. 2 stage E), with the parachutist continuing his/her mission by reaching area Z on the ground by means of his/her parachute. Secure gravitational ejection of the parachutist h is made possible in particular by the absence of a tail and by the positioning of the turbojets 21, 22 laterally on either side and outside the median portion of the fuselage 1 where the compartment 10 is situation, which avoids any risk of interference between the parachutist h and the drone at the moment of their separation at the beginning of free fall. The parachutist h also has an "emergency" mode allowing manual undocking (in the event of a problem during flight), before the drone rolls over on to its back.

Once release has been performed, the drone initiates its procedure of return to a pre-programmed area (FIG. 2 stage F).

If the drone is equipped with an undercarriage, as in the embodiment illustrated in FIGS. 1A-1D, it can subsequently return and land on a runway intended for this purpose.

Otherwise, the fuselage 1 of the drone is equipped with a recovery parachute deployed during the final phase of the return journey after the engine stops, wherein the drone is positioned at the scheduled altitude over the programmed landing area. It can be recovered in this case by teams on the ground or at sea (FIG. 2 stage G) and in the latter case, it is provided to equip the drone fuselage beforehand with inflatable sponsons to ensure its buoyancy after splashdown and before its recovery by dedicated vessels.

Once recovered, the drone according to the invention can be easily reconditioned for a further mission.

FIGS. 3A to 3C illustrate different flight phases of a drone according to a second embodiment of the invention, which differs from the previous embodiment particularly by the presence of a protective cover 30 on the compartment 10 receiving the parachutist h and by the size of this compartment 10, sufficient to accommodate the parachutist h without his/her legs protruding outside. The compartment 10, illustrated in detail in FIG. 4, comprises a relatively flat bottom 32 on which the parachutist can lie down on his/her abdomen without his/her legs protruding outside and a booster support 34 protruding upwards in relation to this bottom 32 to provide the parachutist a comfortable position flat on his/her abdomen with the forearms folded and the upper body partially raised, allowing him/her to access if necessary a control panel in order to perform specific manoeuvres (for example: taking over control during an evasion phase, a modification of the parameters of the initial mission and activation of pre-programmed backup parameters, such as a change of target or an early return of the drone, or indeed triggering of the release manoeuvre and particularly of the phase of rolling over into the inverted position). The side walls of the compartment 10 are furthermore equipped with edges forming bearing surfaces 36 for a subsequent load f2 forming part of the burden f of the parachutist h and located at the lower part of the body, particularly the rear of the legs. During flight, the rear load is strapped to the parachutist h, but is at least partially supported by the bearing surfaces 36 so as to relieve the parachutist from all or part of the weight of the rear load f2. Similar arrangements can be made to laterally support the backpack f1 comprising the parachutist's parachute during flight.

The drone is propelled by a propulsion unit consisting of two turbojets 21, 22 placed under the side wings 11, 12. One can also see in FIG. 4, in which the wings 11, 15 have been deliberately omitted, slides 38 forming means of supporting and guiding the drone in the transport aircraft T and particularly at the time of its release illustrated in FIG. 2B.

In flight configuration, the parachutist h lies in the prone position and if necessary secured inside the compartment by securing means, in practice straps or plasticised rods. The compartment is closed by the cover as illustrated in FIG. 3A.

When the drone reaches a pre-programmed geographical area, which is preferably located some distance from the target, the cover is automatically unlocked and dropped, as illustrated in FIG. 3B. The drone continues its path until it reaches the target area. At the release point, the parachutist h confirms his/her own undocking, which is performed for instance by a pyrotechnically operated blade cutting the securing means. Once undocking of the parachutist has been checked by the parachutist, s/he confirms the actual inversion and release manoeuvre, illustrated in FIG. 3C. The occupant leaves the compartment in free fall. Any risk of collision with the drone is ruled out, insofar that no part of the drone, in the part of the drone located behind the compartment, projects into the area in which the parachutist beginning his/her fall outside the compartment is situated. In particular, the drone does not comprise either a tail or propulsion unit in this area.

A number of different variants are obviously possible. It is possible in particular to combine the characteristics described in different embodiments.

Release can be triggered automatically by any appropriate means, particularly by a barometric or chronobarometric system.

It is also conceivable that the drone is capable of taking off from a runway.

The invention claimed is:

1. A drone comprising:
    a fuselage equipped with means of lift capable of allowing a belly-to-ground flight position and an inverted flight position,
    at least one propulsion unit,
    autonomous navigation instruments,
    an axial compartment forming a recess incorporated in an upper part of the fuselage to receive a parachutist in a prone position the axial compartment having a top opening, and
    avionics provided with programmable control means coupled to the autonomous navigation instruments,
    wherein the avionics comprise means of controlling a rolling procedure for rolling the drone from the belly-to-ground flight position to the inverted flight position and for maintaining the inverted flight position until the parachutist has been dropped,
    wherein the at least one propulsion unit comprises two turbojets positioned laterally on an outside and on either side of a median portion of the fuselage in which the axial compartment is located,
    wherein the fuselage is devoid of a tail fin projecting upwards from the upper part of the fuselage in relation to the belly-to-ground flight position, and
    wherein the drone is devoid of any part which, with reference to a forward direction of motion of the drone in the belly-to-ground flight position, when projected on a transverse projection plane perpendicular to the forward direction of motion and located behind the drone, is overlapped by a projection on said transverse projection plane of a region located directly above the top opening of the axial compartment.

2. The drone of claim 1, wherein the avionics comprise a human-machine triggering interface allowing the parachutist to initiate the rolling procedure.

3. The drone of claim 1, wherein the axial compartment comprises a bottom to accommodate the parachutist in the prone position and a booster support protruding in relation to the bottom to support the parachutist's head or upper part of the torso of the parachutist lying in the prone position.

4. The drone of claim 1, further comprising straps or rods for maintaining the parachutist lying in the prone position and means of automatically undocking the retaining straps or rods.

5. The drone of claim 1, wherein the axial compartment is open.

6. The drone of claim 1, wherein the axial compartment is closed by a cover releasable in belly-to-ground flight position.

7. The drone of claim 1, wherein the fuselage comprises a front windshield.

8. The drone of claim 1, further comprising a hold for carrying an onboard payload,
    wherein the hold is closed off at the bottom by at least one movable flap controlled by said avionics, wherein said compartment is situated above said hold, allowing release of the onboard payload in belly-to-ground flight position.

9. The drone of claim 1, wherein the recess comprises a top part for carrying an onboard payload, the top part is situated, when the drone is in belly-to-ground flight position, above a volume retained in the recess to accommodate at least a portion of the parachutist's body, and the drone further comprises means of undocking attachment points of said onboard payload controlled by said avionics in the inverted position.

10. The drone of claim 1, wherein said programmable control means comprise an onboard computer associated with software and interacting with the autonomous navigation instruments.

11. The drone of claim 1, wherein said autonomous navigation instruments comprise GPS-type satellite positioning means.

12. The drone of claim 1, wherein said fuselage is equipped with a recovery parachute to execute a final phase of a return of the drone to base.

13. The drone of claim 1, wherein the drone is air-droppable from a transport aircraft and comprises supports for supporting the fuselage allowing a controlled separation of the drone from the transport aircraft in the airspace and an automatic ignition for automatically igniting the propulsion unit during gravitational fall of the fuselage.

14. The drone of claim 13, wherein said supports comprise an undercarriage having wheels.

15. Airborne intervention equipment comprising a transport aircraft including a cabin provided with a rear exit, further comprising the drone according to claim 13 loaded into the cabin of said aircraft, wherein the rear exit is equipped with a guidance ramp interacting with said supports of the drone, allowing a controlled separation of the drone from the aircraft in the airspace.

16. The drone of claim 4, wherein the means of automatically undocking the retaining straps or rods are operational to undock the retaining straps when the drone is in belly-to-ground flight position.

17. The drone of claim 4, wherein the means of automatically undocking the retaining straps or rods are controlled by a chronobarometric or purely barometric system.

18. The drone of claim 1, wherein the avionics are operational to maintain the inverted flight position for a predetermined period of time.

* * * * *